United States Patent [19]
Naraghi

[11] Patent Number: 5,715,896
[45] Date of Patent: Feb. 10, 1998

[54] METHOD AND COMPOSITION FOR REDUCING TORQUE IN DOWNHOLE DRILLING

[75] Inventor: Ali Naraghi, Missouri, Tex.

[73] Assignee: Champion Techologies, Inc., Fresno, Tex.

[21] Appl. No.: 677,517

[22] Filed: Jul. 10, 1996

Related U.S. Application Data

[63] Continuation-in-part of Ser. No. 300,308, Sep. 2, 1994, Pat. No. 5,535,834.

[51] Int. Cl.$^6$ ............................. E21B 21/00; E21B 47/00; C09K 7/02
[52] U.S. Cl. ..................... 175/40; 175/61; 175/62; 175/65; 175/66; 507/135; 507/136; 507/128; 507/940
[58] Field of Search .................. 175/40, 61, 62, 175/65, 66; 507/128, 133, 135, 136, 940; 166/301

[56] References Cited

U.S. PATENT DOCUMENTS

| | | | |
|---|---|---|---|
| 3,642,623 | 2/1972 | Bennett et al. | 175/65 X |
| 3,712,393 | 1/1973 | Sheldahl et al. | 175/65 |
| 3,840,460 | 10/1974 | Sheldahl et al. | 175/65 X |
| 4,064,056 | 12/1977 | Walker et al. | 507/136 X |
| 4,496,012 | 1/1985 | Savins | 175/65 |
| 4,821,563 | 4/1989 | Maron | 175/40 X |
| 5,099,930 | 3/1992 | Enright et al. | 175/65 |

*Primary Examiner*—George A. Suchfield
*Attorney, Agent, or Firm*—Gunn & Associates, P.C.

[57] ABSTRACT

The present invention relates to a method and a solution for use in downhole drilling to reduce the torque necessary to rotate the drill string. The solution comprises a phosphate and a sulfonate according to the formula $(RSO_3)_x Me^x$, where R is selected from the group consisting of an alkyl group, an aryl group, an alkylaryl group, and mixtures thereof having a molecular weight between about 280 and about 650, x is the number of $(RSO_3)$ groups, and $Me^x$ is a metal ion having a valence x. The phosphate is preferably a phosphate ester, ether phosphate, or soluble phosphate having a molecular weight in the range of about 300 to bout 900. The phosphate is able to operate at temperatures prevailing in drilling mud systems. The solution is pumped down a drill string as a slug in order to coat solids which accumulate in the well and allow them to be removed along with the drilling fluid.

9 Claims, 1 Drawing Sheet

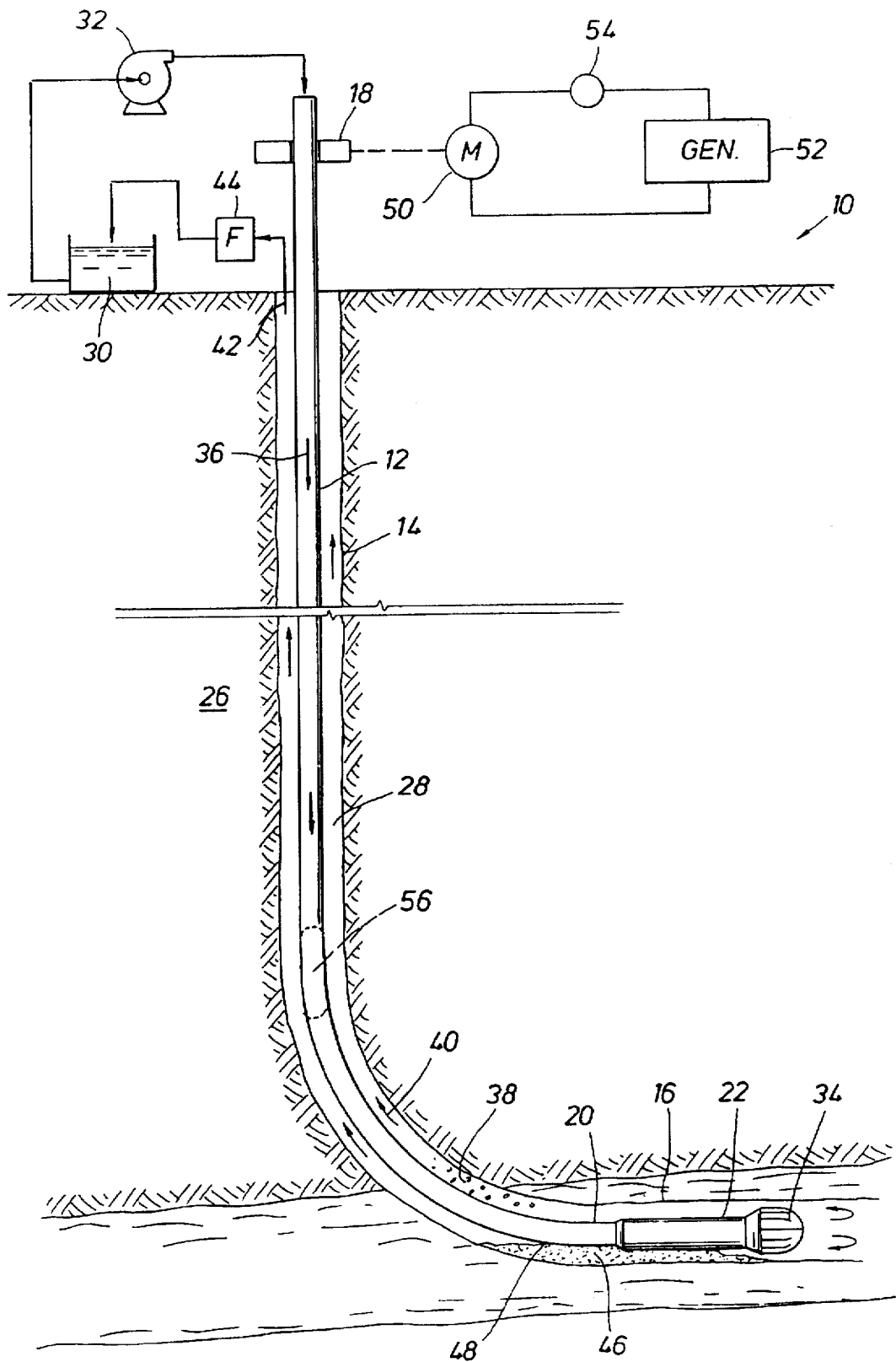

5,715,896

1

METHOD AND COMPOSITION FOR REDUCING TORQUE IN DOWNHOLE DRILLING

FIELD OF THE INVENTION

This disclosure is a continuation in part of application Ser. No. 300,308 filed on Sep. 2, 1994 and issued on Jul. 16, 1996 as U.S. Pat. No. 5,535,834.

The present invention relates to a method for reducing torque required in downhole drilling, and, more particularly, for the torque required in horizontal drilling. The present invention also relates to a torque reduction composition for use in horizontal drilling.

BACKGROUND OF THE INVENTION

Many wells are drilled vertically, such as the wells that are drilled in central Texas into a producing region known as the Austin chalk. The Austin chalk formation is a tight formation. Not only is the producing zone tight, it is relatively narrow, and is generally horizontal strata about 10 or 20 feet thick.

This narrow strata is penetrated by a well which is typically drilled through the strata and therebelow, and subsequently perforations in a casing string are formed opposite the producing formation. This causes production fluids to flow from the formation into the producing well.

Eventually, the rather thin, tightly defined formation will become depleted in that region. Ordinarily, that means that the well must be plugged and abandoned because it is no longer economically useful. As the well becomes depleted, one of the choices that might extend the life is a secondary completion procedure. Rather than simply abandon the well, the well is redrilled in a very special fashion. By backing up the well can be re-entered, and a window is then milled in the casing. The window cuts out about 100–300 feet of the casing. Through the use of a bent sub and a drill motor with a drill bit attached, the well is then continued by causing the drill bit to curve through the window cut in the casing and to drill the side. The radius of curvature is controlled. Therefore the well which is typically vertical in the first instance will then be deviated.

The deviation can be controlled to the extent that the well then is directed horizontally. If the correct point of deviation is selected and if the curvature can be controlled properly, the horizontal well can then be located along the central portion of the strata which produces the desired petroleum products. Indeed, if the strata is at some canted angle with respect to the vertical well, the redrilled well can be directed in the middle of the strata for several hundred feet. It is possible to drill laterally from the vertical well borehole upwards of 1000 feet or so.

In horizontal drilling, the drill bit is advanced into the various formations encountered by the vertical well by grinding at the face of the advancing well borehole, forming chips or cuttings which are carried to the surface in the annular space on the exterior of the drill string. This carries the chips or cuttings to the surface where they are retrieved from the drilling fluid so that the drilling fluid is recycled to be used time and again. There is a substantial downward flow of drilling fluid directed to the drill string and hence there is a substantial return annular flow around the drill string. Even when the well is deviated significantly from the vertical, the foregoing remains true.

To be sure, it is somewhat idealized to represent the drill pipe as being centered within the annular hole. Sometimes, the drill pipe will contact the sidewall and will form what is known as a keyseat. Even in that instance, however, in vertical drilling there still remains a very substantial flow space which is normally concentric around the drill pipe but which may be distorted by keyseating.

As the well is deviated intentionally from a vertical hole toward a nearly horizontal hole, and particularly when drilling with a drill motor, a different type drill bit is used and a different source of power is applied. In that instance, the drill bit is normally rotated by a drill motor which is attached at a lower end of the drill string. Through the use of a bent sub, deviated drilling is controlled.

Furthermore, gravity causes the drill string behind the drill bit to lay against the bottom of the horizontal hole. This assures in all points in time that the return fluid flow including the chips or cuttings from the drilling process must flow above or around the drill pipe but not on all sides of it. So to speak, the drill pipe settles to the bottom of the hole. This creates a larger chance of sticking which is somewhat similar to keyseating with a vertical well. The chance of sticking is increased in proportion to the length of horizontal hole. For instance, if the horizontal portion of the well is only 200 feet, there is less chance of sticking than there would be if the horizontal portion of the hole were 1000 feet.

Generally, horizontal drilling is highly desirable, but is limited in part by the tendency to stick as the horizontal hole becomes longer and longer. Indeed, a horizontal well can substantially enhance production from a formation which is otherwise depleted. By contrast, this high production rate is achieved only when the horizontal hole is fairly long. As the horizontal portion is made longer sticking becomes a greater problem.

One aspect of sticking derives from embedding of the cuttings which are dislodged by operation of the motor and drill bit. The cuttings are flushed back towards the well head and forced to flow horizontally in the hole. The flow rate of the drilling fluid is normally sufficient to carry the cuttings. There is, however, some tendency of the cuttings to settle in this flowing drilling fluid and they tend to fall towards the bottom of the horizontal hole.

The bottom side of the horizontal hole is immediately adjacent to the curving drill string. If the drill string is resting against the bottom and the chips or cuttings fall toward the bottom there is the risk that the chips will be forced under the drill pipe and become embedded in the mudcake, perhaps embedding into the formation being drilled. If this occurs, an excessive number of chips or cuttings can be collected under the drill string and thereby create something of a chip buildup or accumulation on the bottom side of the well borehole.

Thus, a need exists for a composition and method for decreasing the buildup of cuttings in the annulus of a wellbore.

SUMMARY OF THE PRESENT DISCLOSURE

The present invention provides a liquid solution for reducing the torque required by a drilling rig to rotate a drill string when added to a drilling fluid. The solution comprises a sulfonate selected from the group consisting of alkyl sulfonates, aryl sulfonates, alkylaryl sulfonates, and mixtures thereof, Wherein the sulfonates are defined according to the formula $(RSO_3)_x Me^x$; where R is an alkyl, aryl, or alkylaryl group, which may be either saturated or unsaturated and either linear or branched, having a molecular weight between about 280 and about 650, and $Me^x$ is a metal ion having a valence x; and a solvent having sufficient aromatic character to solvate sulfonates. In an alternate embodiment, a liquid solution comprising a sulfonate and a phosphate is provided. This additive solution is preferred in wells with elevated temperatures. Typically, the molecular weight of the phosphate is between about 300 and 900. The relationship of the sulfonate molecule and the phosphate molecule is about 1:1.

The invention also provides a method for reducing the torque necessary to rotate a drill string in a well, comprising the steps of pumping the solution down a drill stem along with the drilling mud and removing solids from the well along with the drilling mud. The solution may be pumped in a slug, in a multiple of slugs, or continuously.

BRIEF DESCRIPTION OF THE DRAWINGS

The only view is a schematic drawing of a drill string forming a horizontal wellbore.

DESCRIPTION OF THE PREFERRED EMBODIMENT

The inventor has found that a complex composition can be used to flush a hole free of cuttings. The inventors have also found that the composition can be applied in a single slug or pill which removes a substantial amount of cuttings.

The present invention relates to a method and solution for use in downhole drilling to reduce the torque necessary to rotate the drill string. This invention can provide many benefits to the exploration industry in horizontal drilling. Marginal successes and extreme costs with horizontal drilling have limited the number of attempted drilling projects in many areas. The present invention can overcome the many downhole problems encountered with drilling a horizontal lateral wellbore.

The present disclosure is directed to a torque reducing slug which is administered to the flow of drilling fluid injected into the well through the drill string from the mud pump on the surface. Typically, the dosage is delivered in one barrel doses or slugs. A slug of this material is administered to the well by injection into the mud flow stream from the surface. It is injected apt or downstream from the mud pump. The mud pump normally provides sufficient pressure to force the drilling fluid through the drill string. The slug of material in accordance with the present disclosure is delivered more or less as a single slug by flowing through the drill string from the surface to the well borehole at which juncture it is distributed in the annular space by flowing through the drill bit. When it flows through the drill bit, it is spread in the column of drilling fluid that fills the well borehole and is available for contact with the cuttings, the mudcake, and the supportive circular wall which is defined by the cylindrical borehole. Even where the borehole deviates from a perfect cylinder, the slug which is delivered by the present disclosure is effective. A single slug has been shown to experimentally reduce the drag encountered by the power system necessary for operation. Consider as an example one measure of drag which is indicated indirectly, but quite reliably, by the amount of electric power which is required to operate the drill motor. When that occurs, the drill motor can be operated with a marked reduction in current. While there are many types of drilling rigs, it is not uncommon, and it is probably prevalent, to use a diesel powered electric generator which provides current for operation of a motor which rotates to the rotary table. If a set of given conditions are achieved, thereby requiring a specified current flow for operation under those conditions, and a slug is administered to the well, the drop in current for operation at the same conditions is a very good indication that drag and torque requirements have been decreased. In that particular instance, the slug of the present invention has a direct quantitative impact on operation of the equipment. This certainly indicates that an advantage has been accomplished and that significant gains have been achieved in operation of the drilling system of the present disclosure.

The slug is a multi-component liquid product which can be used in either oil-based or water-based drilling fluids. The product is a solution comprising a surfactant and a solvent. The solution is pumped down a drill string as a slug in order to coat solids which accumulate in the well and allow them to be removed along with the drilling fluid. When the product comes into contact with the cuttings, the amount of solids removed to the surface in the drilling fluid is significantly increased. Solids are able to remain suspended in the drilling fluid due to the solids coating or wetting abilities of the product. Accordingly, the solids flocculate in increasingly larger quantities in proportion to the slug size. This flocculation gives the wellbore a cleaner annulus which reduces pipe drag, particularly in horizontal wellbores.

The solution of the present invention includes surfactants in a solvent. The surfactants are included in the solution in amounts between about 5 and about 35 weight percent. The preferred concentration of surfactant is from about 20 to about 35 weight percent. The surfactants of the present invention may be any surfactant which is miscible in the solvent selected including sulfurized sperm oil, sulfurized lard oil, and sulfurized fatty amides having equivalent weights greater than 500. These surfactants give drilling fluids excellent lubricity, anti-wear properties, and provide corrosion protection in drilling fluids. The process of sulfurizing is the saturation of a carbon-carbon double bond (—C=C—) with sulfur (—CS—CS—).

More particularly, the liquid solution is comprised of between about 5 and about 25 weight percent of a surfactant selected from the group consisting of alkyl sulfonates, aryl sulfonates, alkyl sulfonates, and mixtures thereof. These sulfonates are defined according to the formula $(RSO_3)_x Me^x$ where R is an alkyl, aryl, or alkylaryl group having a molecular weight between about 280 and about 650, and $Me^x$ is a metal ion having a valence x. The valence, x, of the metal ion will dictate the number of sulfonate groups, x., which is generally a number between 1 and 4 but may be as high as 6.

Alkyl sulfonates are preferred, while petroleum sulfonates are most preferred. The addition of 0.2% of an oil soluble petroleum sulfonate, for example, reduces the surface tension of water from 76 dynes per cm to 42 dynes per cm. One half that amount (0.1%) of the same oil soluble petroleum sulfonate will reduce the interfacial tension between a petroleum oil and water from 51 dynes per cm to 2.1 dynes per cm. A preferred surfactant system is a mixture of sodium petroleum sulfonate, ethoxylated polymer acid, amine salts of alkyl naphthalene sulfonate, and ethoxylated fatty acid. Another preferred surfactant system is a mixture of one or more alkyl sulfonates and one or more surfactants selected from the group consisting of sulfurized sperm oil, sulfurized lard oil, and sulfurized fatty amides having equivalent weights greater than 500.

The solvent must have sufficient aromatic or polar character in order to solvate each component of the solution and is typically between about 20 and about 50 weight percent of a solvent selected from the group consisting of aromatic naphtha, isopropyl alcohol, and mixtures thereof. The preferred solvent is a mixture of aromatic naphtha and isopropyl alcohol. The most preferred solvent includes about 30 weight percent aromatic naphtha and about 20 weight percent isopropyl alcohol. Other solvents which are known to work in the solution of the present invention include methanol, ethylene glycol, mineral seal oil, and mixtures thereof.

In an alternative embodiment of the present invention, the liquid solution can further include certain carboxylic acids such as ethoxylated fatty acids, ethoxylated fatty alcohols, and ethoxylated fatty amines. More particularly, the preferred carboxylic acids of the present invention comprise between about 20 and about 30 weight percent of an ethoxylated fatty compound according to the formula

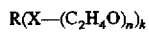

wherein R contains from about 12 to about 56 carbon atoms and is selected from the group consisting of a linear alkyl group, a branched alkyl group, and an alkylaryl group; wherein X is selected from the group consisting of a carboxyl group (—COO—), an oxygen atom (—O—), a secondary amine (—NH—), and mixtures thereof; and wherein n is a number from 1 to 20; and wherein k is a number from 1 to 3.

When preparing the solution, it is preferred that the components be mixed together in the following order: aromatic naphtha, isopropyl alcohol, polymer fatty acid, solvent, and surfactants.

The solution of the present invention is typically characterized by, but not limited to, the following physical properties.

| | |
|---|---|
| Specific gravity at 60° F. | 0.7–1.2 |
| Density at 60° F. | 5.8–10.0 lb/gal |
| Flash Point | 95° F. |
| Solubility | Oil |
| Pour Point | −35–+35° F. |
| Viscosity at 60° F. | 20 to 6000 centipoise |
| Appearance | Dark brown liquid with alcohol odor |

The present invention addresses many problems including rotary table torque, downhole solids removal, slow bit penetration, drill string pick-up weight, and drill pipe trip time. One common factor in each of these problems is solids removal. The troublesome solids are cuttings, created by the drilling action, which settled in the hole rather than being removed in the drilling fluid. Over time, the buildup causes additional friction on the pipe.

Referring to the only view, drilling apparatus 10 is shown creating a horizontal wellbore. The drill string 12 extends downward through the vertical wellbore section 14 and through the horizontal wellbore section 16. The above ground portion of the drill string 12 is disconnectably coupled with the rotary table 18 of a drilling rig. The terminal end of the drill string 20 is connected to a mud motor 22 and a drill bit 34.

As the drill bit 34 progresses through the ground formation 26, it creates a wellbore having a diameter greater than that of the drill string 12. This creates an annular region 28 around the drill string 12.

The normal mode of operation for drilling apparatus 10 requires that a drilling fluid (or mud) be pumped from a tank or pond 30 by a mud pump 32 down through the drill string 12 in the direction shown by the arrow 36. The pressurized mud travels down to the drill motor 22 which uses the pressurized mud to produce a rotary motion on the drill bit 34. As the drill bit 34 cuts through the formation 26, it produces granular cuttings or solids 38 which are typically carried away by the drilling fluid flowing through the annulus 28 in the direction shown by arrow 40. The returning drilling fluid or mud exits the top of the wellbore as indicated by the arrow 42. The solids are then filtered out of the fluid by a filter 44 or other device before being returned to the mud tank or pond 30.

While the foregoing description is the intended mode of operation, it is common that solids may fall out of the drilling fluid and settle in the wellbore hole. This is a particular problem in a horizontal wellbore section 16, where the solids 46 accumulate on the bottom of the wellbore 16 around the drill string 12 which lays on the bottom surface 48. The accumulated solids can cover a large surface area of the drill string 12 and cause great increases in the torque required by the rotary table 18 to rotate the drill bit 34 or to lift the drill string 12 off the bottom of the well.

The drill string 12 is rotated by the rotary table 18 which is powered by an electric motor 50. A current generating source 52, typically a diesel engine, provides a direct current to the motor 50. The current required to operated the rotary table 18 can be measured by an ammeter 54. Because the amount of torque required to rotate the drill bit 34 is proportional to the current, the current reading from the ammeter 54 is a convenient indicator of increasing or decreasing torque requirements.

The solution of the present invention reduces the torque requirements by increasing the solids removal from the annulus 28. Typically, a slug of the solution 56 is pumped down the drill string 12. After exiting through the drill bit 34, the solution becomes dispersed in the drilling fluid and comes into intimate contact with the sides of the wellbore 16 as well as the suspended solids 38 and the surface 48 of the accumulated solids 46.

The particulate coating abilities of the solution enables greater amounts of solids to remain in the, fluid flow. In addition, the solution causes solids to flocculate in larger quantities as the concentration of the solution is increased. Flocculation keeps the annulus 28 of the wellbore 14 and 16 cleaner. This reduces pipe drag and strain on rotary equipment.

In field trials, the solution was shown to be most effective in 55 gallon pills or slugs. Where torque continues to be severe, the solution may be input into the pump suction at a rate of about ½ drum per hour. Maintaining a continuous feed of the solution prevents excessive buildup of solids and, therefore, helps maintain a lower torque between slugs. Although it may still be necessary to periodically add a slug to the well, the continuous feed will lengthen the interval between slugs. Average consumption for a 90 degree angle at approximately 12,500 feet to 13,500 feet is about 3 drums per 24 hours. This rate increases to about 4 drums per 24 hours as the horizontal leg lengthens to around 14,000 feet down.

It is typical that solids circulation to the surface stops once the drill string is lifted off the bottom of the well. As the drill string is lifted, solids will settle to the bottom. In many cases, when drill pipe is being tripped back to the boitom, the drill pipe must be screwed in order to reach the previous depth. However, when a single drum pill is circulated the length of the lateral wellbore prior to tripping the pipe off the bottom, the pickup weight is greatly reduced and the trip back to the bottom is dramatically faster.

The solution of the present invention can be successfully used in a wide variety of fluid types including fresh water, brine water, light and heavy clay muds, water containing calcium chloride, calcium bromide, and zinc bromide. The solution also works well where the fluid is a mixture of the fluid types just mentioned.

EXAMPLE 1

A solution was prepared having 32 weight percent aromatic naphtha, 23 weight percent isopropyl alcohol, 22 weight percent fatty polymer acid, 18 weight percent surfactant (8 wt. % sodium petroleum sulfonate, 4 wt. % ethoxylated polymer acid, 4 wt. % ethoxylated fatty acid, and 2 wt. % alkyl naphthalene amine salt sulfonate), and 5 weight percent water.

A 55 gallon drum of the solution was injected into a wellbore as a slug. When the solution reached the bottom of the well the torque was reduced. In the table below, and also in all references t torque, the variable related to torque is the amount of current in amperes. Generally, the current is direct current because most drilling rigs use DC current. The following is a brief log of the results:

TABLE NO. I

| Time | Activity | Rotary Torque (DC amperes) | Rate of Penetration (ft/hr) |
|---|---|---|---|
| 1:00 | Pump one drum | 525 | 8 |
| 2:00 | Solution reaches bottom of well | 365 | 10 |
| 3:00 | continue drilling | 380 | 14 |
| 4:00 | continue drilling | 385 | 13 |
| 5:00 | continue drilling | 390 | 14 |
| 6:00 | continue drilling | 400 | 12 |
| 7:00 | continue drilling | 440 | 11 |

During the first hour after adding the one drum slug, the rotary torque dropped by 160 amperes and the rate of penetration increased. In addition, the pickup weight, defined as the amount of force required to get the bit off bottom, was decreased from 300,000 pounds to 240,000 pounds.

Another surprising result was that the time required to trip the pipe back to the bottom of the hole was greatly reduced from the typical range of 20 to 28 hours to about 12 hours. Solids removal and/or solids coating by the solution kept the wellbore clean, thereby allowing the drill pipe to slide and maintain a constant weight on the drill bit.

The coating action could be seen as the mud returned to the mud tanks from the bottom of the hole. The oil soluble solution coated the chalk drill cuttings and kept them in the return stream. This allowed the hole to be swept clean and reduced both torque and drag on the pipe.

EXAMPLE 2

A pipe string was in a rotary stall condition such that the rig could not move the pipe up, down, left, or right. Two pills or slugs were prepared by mixing one 55 gallon drum of the solution of Example 1 with 40–55 barrels of the drilling fluid. The pump strokes were lowered from 70–75 strokes per minute (spm) to about 40–50 spm to allow the sweep solution a longer contact time. The pipe was continually worked.

When the first slug reached bottom, the second slug was pumped downhole. As the second slug reached bottom, the pipe became unstuck and the rotary torque declined dramatically.

EXAMPLE 3

A drilling rig had completed a 93.1 degree angie section turn and continued drilling the lateral wellbore out to approximately 2,119 feet before encountering heavy drill pipe torque and pipe drag which jeopardized completion of the well. The total amount of drill pipe in the hole at that time was 13,419 feet with a total string weight of 235,000 pounds and a string pick-up weight of 310,000 pounds.

Fifty-five gallons of the solution of Example 1 were mixed with 50 barrels of 9.7 pound/gallon brine water which was available at the site. This pill was circulated to the bottom while the rig continued drilling. The pipe drag pick-up weight was reduced to approximately 240,000 pounds—a reduction of 70,000 pounds. In addition, the rotary torque dropped from 460 amperes to 375 amperes, a 17.5% reduction, in a matter of 37 minutes. The average rate of penetration experienced a 47% increase, starting at 15 feet per hour and rising to approximately 22 feet per hour (ft/hr).

Six hours after the pill addition, the rotary torque had increased slightly to 400 amperes and the rate of penetration had fallen to 18 ft/hr.

A little more than two days after the pill addition, the rotary torque has risen to 467 amperes. A second pill, identical to the first, was pumped down the hole. Fifty minutes later, the torque had dropped to 389 amperes and the rate of penetration increased from 14.6 ft/hr to 18.5 ft. hr.

Twenty-six hours after the second pill, with 403 amps torque and 15.7 ft/hr penetration, a third identical pill was pumped down the hole. Torque rapidly dropped to 325 amps and the penetration increased to 19.6 ft/hr.

It was three days following the third pill before the torque had increased to require 475 amps. The pipe string was now 14,387 feet long with a penetration rate of 12 ft/hr. Two highly concentrated pills were prepared by mixing 55 gallons of solution with only 20 barrels of brine water. One hour after the first pill was added, the torque was down to 420 amps and the penetration was 17 ft/hr. At that time, the second of the two concentrated pills was pumped downhole. One hour later, the torque was 375 amps and the penetration rate increased to 21 ft/hr.

After three additional days, a total of 10 days after the pipe first encountered heavy pipe torque and drag, the inclined lateral section of the well was completed with approximately 4,075 feet of upslope horizontal hole. This was accomplished with only 5 barrels (275 gallons) of the product solution.

Several more examples of the torque reducing additive wire made and tested with a specific test apparatus and routine are discussed below. These were made with the several formulations given in the next few examples. They were tested to provide the data given in tabular form. The examples were:

EXAMPLE 4

This example involved mixing about 40 weight percent alkylaryl sulfonic acid with about 20 weight percent ethoxylated sunaptic acids, in an aromatic solvent making up the remainder, or about 40 weight percent.

EXAMPLE 5

This example was made by mixing about 60 weight percent ether phosphate, 5 weight percent isopropanol, and about 35 weight percent water. The other examples below are given in tabular form.

EXAMPLE 6

| | |
|---|---|
| ETHER PHOSPHATE, POTASSIUM SALT | 50% |
| ISOPROPANOL | 5% |
| ALKYLARYL SULFONIC ACID | 15% |
| DIMER-TRIMER FATTY ACIDS, ETHOXYLATED | 10% |
| WATER | 20% |

EXAMPLE 7

| | |
|---|---|
| AROMATIC SOLVENT | 40% |
| DODECYLBENZENE SULFONIC ACID | 20% |
| TRIETHANOLAMINE | 5% |
| ALKYLARYL SULFONATE | 10% |
| ETHER PHOSPHATE | 10% |
| SUNAPTIC ACIDS, ETHOXYLATED | 10% |
| DIMER-TRIMER FATTY ACIDS, ETHOXYLATED | 5% |

EXAMPLE 8

| | |
|---|---|
| WATER | 40% |
| ISOPROPANOL | 10% |
| ETHER PHOSPHATE, POTASSIUM SALT | 20% |
| ETHER PHOSPHATE | 25% |
| ALKYLARYL SULFONIC ACID | 5% |

EXAMPLE 9

| | |
|---|---|
| AROMATIC SOLVENT | 20.7% |
| WATER | 5.0% |
| ISOPROPANOL | 23.0% |
| PETROLEUM SULFONIC ACIDS, SODIUM SALT | 22.8% |
| DIMER-TRIMER FATTY ACIDS, ETHOXYLATED | 11.4% |
| ALKYLARYL SULFONATE | 5.7% |
| SUNAPTIC ACIDS, ETHOXYLATED | 11.4% |

EXAMPLE 10

| | |
|---|---|
| AROMATIC SOLVENT | 42.5% |
| PETROLEUM SULFONIC ACIDS, SODIUM SALT | 15.0% |
| DODECYLBENZENE SULFONIC ACID | 18.0% |
| TRIETHANOLAMINE | 4.5% |
| ETHER PHOSPHATE | 15.0% |
| DIMER-TRIMER FATTY ACIDS, E ETHOXYLATED | 5.0% |

EXAMPLE 11

| | |
|---|---|
| AROMATIC SOLVENT | 50% |
| ETHER PHOSPHATE | 20% |
| PETROLEUM SULFONIC ACIDS, SODIUM SALT | 20% |
| TALLOW AMINE, ETHOXYLATED | 10% |

EXAMPLE 12

| | |
|---|---|
| AROMATIC SOLVENT | 50% |
| ALKYLARYL SULFONATE | 10% |
| MEDIUM WEIGHT PETROLEUM SULFONATES | 20% |
| PHOSPHATE ESTERS | 20% |

EXAMPLE 13

| | |
|---|---|
| AROMATIC SOLVENT | 40% |
| TRIETHANOLAMINE | 2.5% |
| DODECYLBENZENE SULFONIC ACID | 10% |
| ALKYLARYL SULFONATE | 20% |
| PHOSPHATE ESTERS | 12.5% |
| MEDIUM WEIGHT PETROLEUM SULFONATES | 10% |
| ETHOXYLATED FATTY ACIDS | 5% |

The several exemplary formulations were tested in several tests described below against a standard labeled S2.

The first series of tests (see Table II) using metal to metal contact, with a material/diesel oil mixture concentration of 10% by volume, showed that all the samples tested except the standard labeled S2 gave greater than 73% torque reduction. The sample labeled EXAMPLE 7 gave the greatest torque reduction.

Table III is shows the performance, at a lower concentration, of four of the material samples tested in the series of tests of Table II. The concentration of material/diesel mixture used for these tests was 2% by volume. At this concentration, only the sample labeled EXAMPLE 7 showed acceptable lubricity using metal to metal contact.

Table IV shows the results of the lubricity tests using Austin Chalk core (formation) to metal contact. The same materials at the same concentration (10% by volume) used for the metal to metal contact series (Table II) were used. This data shows that the samples labeled EXAMPLE 5-7 and 9 gave the best torque reduction (56.0–66.67%). The sample labeled EXAMPLE 8 gave the least torque reduction under these test conditions.

The data in Table V shows the performance of the samples EXAMPLES 10–13 and the samples EXAMPLE 7 and EXAMPLE 9 using Austin Chalk core (formation) to metal contact. The concentration of the material/diesel oil mixture was 10% by volume. The EXAMPLES 10–13 samples at this concentration provided a torque reduction of 43.48–58.33%. The repeat of the test with the sample labeled EXAMPLE 7 gave results similar to the torque reduction observed earlier (see Table IV); however, the torque reduction observed for the sample EXAMPLE 9 was less than had been observed earlier (see Table IV).

EXPERIMENTAL PROCEDURE

EQUIPMENT AND PREPARATION

Cubes of an appropriate size normally used in a lubricity tester were cut from a Austin Chalk core sample. One face of the formation block was carefully cut to provide a concave surface concentric to the metal race in the Lubricity Tester.

The lubricity tester drags a steel block pressed against a steel race with a constant force while the race is rotated at a constant rpm. A measure of the amperage required to maintain a constant motorspeed (rotation) is read directly by an ammeter and is used to calculate the coefficient of friction. In effect, the block functions as a brake while pressed against the rotating member. This simulates a steel drill pipe rotating in a casing.

Water is used to lubricate the equipment. A water container is raised into position (immersing the race and block in the fluid) and the torque (150 inch-pounds) is applied. The equipment is calibrated for use when the block and race are immersed in water and a dial reading of 33 to 34 is observed with a force of 150 inch-pounds while rotating at 60 rpm. This equates to a coefficient of friction for water of 0.33 to 0.34. The cup containing the water is removed and a cup containing the base fluid to be tested is placed in position wetting the race and block. After 5 minutes, the dial reading is recorded for calculation of the coefficient friction or percent torque reduction. In the cup containing the base fluid, a syringe adds, the desired concentration of the material to be evaluated. After 5 minutes the dial reading is recorded and the coefficient of friction or percent torque reduction is calculated.

Tests were conducted using the metal in to metal (block and race) contact. This is the procedure commonly used in the drilling fluids industry to evaluate the performance of lubricity additives. This gives an indication of the coefficient of friction or torque reduction between the drill string and the casing (metal to metal).

Tests were also conducted with formation material (Austin chalk core) to metal contact. This provides an indication of the effect the material will have on the drill string to formation (open hole) contact.

The materials for testing were concentrated. The concentrated material was mixed at 5% by volume with diesel oil. The mixture was stirred on the Hamilton Beach mixer for 20 minutes to ensure an equilibrium mixture was obtained. The material/diesel oil mixture was then added at the desired concentration to the base fluid.

An untreated sample of the base fluid was used to establish a base line for comparison. The core formation specimen or the metal block was placed in the torque arm and the arm was closed by applying a torque reading of 150 inch-pound. A cup of the base fluid immersed the formation specimen or metal block and race interface. The current reading was taken after 5 minutes of exposure of the base fluid to the formation core specimen or metal block/race interface. The material/diesel oil mixture at the concentration to be tested was added to the base fluid. The applied torque was not altered during treatment of the base fluid with the material/diesel oil mixture. This practice was used so the contact region of the formation specimen or metal block/race interface did not change. After exposure of the formation specimen or metal block/race interface to the treated fluid for 5 minutes, the current reading was recorded.

The percentage reduction in torque was calculated as follows:

% Torque Reduction=$A-B/A \times 100$ where:

A=current reading of the base mud, and

B=current reading of the base mud treated with material/diesel oil mixture

The data in Table II shows the % torque reduction of the materials tested using the metal to metal procedure. The sample labeled EXAMPLE 7 at a concentration of 10% by volume gave the best torque reduction. All the materials tested except the standard gave good torque reduction in the metal to metal procedure. The standard gave the poorest torque reduction of all the tested materials. Since diesel oil was used as the carrier fluid for all the experimental materials tested, 10% by volume diesel oil was tested to determine what effect it would have on the base fluid. The data shows it has no appreciable effect.

Since the date in Table II was determined using a concentration of 10% by volume of the material/diesel oil mixture, it was decided to test selected materials from this series at a different concentration. The test procedure used was again metal to metal. The concentration chosen was 2% by volume. The date in Table III shows the results of this series of tests. The only material that shows a significant reduction in torque at this concentration was sample EXAMPLE 7. The other materials tested showed very minimal effect on torque.

The above data suggests certain materials will significantly reduce the torque observed when there is metal to metal contact. Recall that metal to metal contact is important when rotating the drill string inside casing. Rotation of the drill string in open hole involves metal to formation contact. To simulate this, Austin chalk formation samples were cut into blocks that replaced the metal block commonly used in lubricity testing. The data in Tables III and V was collected using this technique.

Table IV gives the results of tests of several materials at a concentration of 10% by volume when using the formation core specimen to metal procedure. This data shows none of the materials are as effective as when using metal to metal contact. The torque reduction observed, however, indicates all of the materials except the EXAMPLE 8 were effective for reducing the torque when contact is between formation material and metal.

Table V provides data for a series of materials labeled EXAMPLE 10–13 and samples EXAMPLE 7 and 9. The procedure used was formation to metal contact. This data suggests, samples EXAMPLE 10–13 are as effective as the samples EXAMPLE 4 to 7.

The formation specimens may scatter data since it is difficult to cut the specimens with exactly the same curvature. The absolute % torque reduction observed is not important, but what is important is that a significant reduction in torque was observed in both cases for sample of EXAMPLE 9.

TABLE NO. II

| METAL/METAL CONTACT | |
|---|---|
| SAMPLE | % TORQUE REDUCTION |
| Diesel Oil | 7% |
| EXAMPLE 4 | 77% |
| EXAMPLE 5 | 87% |
| EXAMPLE 6 | 74% |
| EXAMPLE 7 | 94% |
| EXAMPLE 8 | 79% |
| EXAMPLE 9 | 84% |
| S2 | 48% |

TABLE NO. III

| METAL/METAL CONTACT | |
|---|---|
| SAMPLE | % TORQUE REDUCTION |
| EXAMPLE 5 | 1% |
| EXAMPLE 7 | 84% |
| EXAMPLE 9 | 3% |
| S2 | 10% |

TABLE NO. IV

FORMATION/METAL CONTACT

| SAMPLE | % TORQUE REDUCTION |
|---|---|
| EXAMPLE 4 | 43% |
| EXAMPLE 5 | 61% |
| EXAMPLE 6 | 56% |
| EXAMPLE 7 | 50% |
| EXAMPLE 8 | 10% |
| EXAMPLE 9 | 66% |
| S2 | 46% |

TABLE NO. V

FORMATION/METAL CONTACT

| SAMPLE | % TORQUE REDUCTION |
|---|---|
| EXAMPLE 10 | 57% |
| EXAMPLE 11 | 54% |
| EXAMPLE 12 | 43% |
| EXAMPLE 13 | 46% |
| EXAMPLE 7 | 53% |
| EXAMPLE 9 | 48% |

IMPROVED SULFONATE AND PHOSPHATE SYSTEM

The present disclosure sets forth an improved composition which provides the enhanced torque reduction exemplified in the foregoing tables. The dual component slug of this discussion provides torque reduction which is administered in the same fashion as set forth above. It can be used with drilling fluids which have oil or water constituents. The slug as stated above is pumped down the drill string to coat the solids which accumulate in the well thereby enhancing the removal of cuttings. The slug is therefore a liquid solution which is typically provided in barrel quantifies to be administered during the drilling process. In the ordinary drilling process, drilling continues while the slug is added. It is normally pumped down in the mud flow delivered through the drill pipe, flowing up through the drill bit and is normally returned to the surface in the annular space on the exterior of the drill string. This helps in the rotation of the drill string and especially in horizontal wells. In that typical situation, the drill string is normally required to rotate in the well in a portion which is cased and in another portion where it bears against the formation. Hence, Tables II–IV record data for both circumstances. The preferred solution typically uses a sulfonate and a phosphate. These are provided in proportions as will be described below.

More particularly, the sulfonate part of the solution is comprised of up to about 40 weight percent selected from the group consisting of alkyl sulfonates, aryl sulfonates, alkyl sulfonates, and mixtures thereof. These sulfonates are defined according to the formula $(RSO_3)_xMe^x$ where R is an alkyl, aryl, or alkylaryl group having a molecular weight between about 280 and about 650, and $Me^x$ is a metal ion having a valence x. The valence, x, of the metal ion will dictate the number of sulfonate groups, x, which is generally a number between 1 and 4 but may be as high as 6. Alkyl sulfonates are preferred, while petroleum sulfonates are most preferred. A mixture of sodium petroleum sulfonate, ethoxylated polymer acid, amine salts of alkyl naphthalene sulfonate, and ethoxylated fatty acid is acceptable. Another preferred system is a mixture of one or more alkyl sulfonates and one or more surfactants selected from the group consisting of sulfurized sperm oil, sulfurized lard oil, and sulfurized fatty amides having equivalent weights greater than 500.

In addition to sulfonate mentioned above, it has been discovered that useful phosphates can be added. As a generalization, the phosphates acceptable in the present system include those exemplified in EXAMPLE 5–8, and EXAMPLES 10–13 above. The phosphate is preferably selected from the group consisting of ether phosphates, ester phosphates, and other phosphates which are soluble in a drilling fluid having oil or water as its major component. Typically, the phosphate can have a molecule weight between about 300 and about 900. This provides a molecular which is approximately equal to that of the sulfonate as mentioned above.

The relationship of the sulfonate molecule and the phosphate molecule is ideally about 1:1. As will be understood, a sharp precise measurement is not needed and so the phosphate is typically mixed in the slug to an amount providing the equivalent number of molecules within a range of about plus or minus 20% of the sulfonate molecules.

The phosphate is preferably selected so that it is stable at elevated temperatures. Even in the deepest wells which are exposed to bottom hole temperatures which might otherwise degrade a phosphate molecule, the flow rate of the slug of the present disclosure is sufficiently fast that it does not become heated for such an interval that phosphate degradation occurs. Generally speaking the circulation of the mud system keeps the temperature of the drill pipe, the mud flow on the interior of the drill pipe, the mud flow in the annular space, and the coating on the steel pipe at a stabilized temperature which is sufficiently low that degradation with heat does not occur. As a generalization, the dual molecule system of this system will endure even after dilution in the larger volume of the mud in the drilling system, and will also provide substantial benefit even with such high levels of dilution.

On review of the data from the several examples given above, EXAMPLE 7 appears to provide the best performance. A set of ranges for the constituents of EXAMPLE 7 is given below in EXAMPLE 7' and the constituent relationships are given:

EXAMPLE 7'

| | |
|---|---|
| DODECYLBENZENE SULFONIC ACID | 5–30% |
| TRIETHANOLAMINE | 0–05% |
| ALKYLARYL SULFONATE | 3–18% |
| ETHER PHOSPHATE | 5–15% |
| SUNAPTIC ACIDS, ETHOXYLATED | 2–15% |
| DIMER-TRIMER FATTY ACIDS, ETHOXYLATED | 0–10% |
| AROMATIC SOLVENT | REMAINDER |

While the foregoing is directed to the preferred embodiment of the present invention, other and further embodiments of the invention may be devised without departing from the basic scope thereof, and the scope thereof is determined by the claims which follow.

What is claimed is:

1. A method for reducing the torque necessary to rotate a drill string in a well, comprising the steps of:
   (a) intermittently pumping a liquid solution down a drill stem thereby displacing a drilling mud being pumped within said drill stem, wherein said drilling mud comprises either oil or water as its major component; wherein the liquid solution comprises;

a phosphate soluble in said liquid solution and having a molecular weight of up to about 900, a sulfonate defined according to the formula $(RSO_3)_x Me^x$ where R is selected from the group consisting of an alkyl group, an aryl group, an alkylaryl group, and mixtures thereof, having a molecular weight between about 280 and about 650, x is the number of $(RSO_3)$ groups, and $Me^x$ is a metal ion having a valence x; and a solvent having sufficient aromatic character to solvate said phosphate and sulfonate; and (b) recirculating the drilling mud with the liquid solution.

2. The method of claim 1 wherein the sulfonates comprises up to about 35 weight percent of the liquid solution and the phosphates comprises up to about 35 weight percent thereof.

3. The method of claim 1 wherein the liquid is pumped down a drill stem as a slug.

4. The method of claim 3 wherein second and subsequent slugs are pumped down the drill string until drill string torque is reduced.

5. The method of claim 1 including drilling a well with an upper vertical portion and a lower deviated portion with the drill string providing a passage to deliver the liquid solution to the end of the drill string.

6. The method of claim 5 including the step of reducing torque for the drill stem in a horizontal well portion.

7. The method of claim 1 including the step of drilling with an electrically powered motor and measuring current consumption thereof.

8. The method of claim 1 including the step of pumping the liquid solution periodically to the end of the drill stem and out a drill bit attached to the end of the drill stem.

9. The method of claim 1 including the step of drilling by rotating the drill stem from a rotary table at the surface and pumping the liquid solution periodically along the drill stem so that the liquid solution is forced by continued pumping to flow along the drill stem in an open borehole.

* * * * *